(12) United States Patent
Chirica et al.

(10) Patent No.: US 8,518,346 B1
(45) Date of Patent: Aug. 27, 2013

(54) MULTIDIMENSIONAL BIOSEPARATION WITH MODULAR MICROFLUIDICS

(75) Inventors: Gabriela S. Chirica, Livermore, CA (US); Ronald F. Renzi, Tracy, CA (US)

(73) Assignee: Sandia Corporation, Albuquerque, NM (US)

( * ) Notice: Subject to any disclaimer, the term of this patent is extended or adjusted under 35 U.S.C. 154(b) by 39 days.

(21) Appl. No.: 12/157,601

(22) Filed: Jun. 11, 2008

Related U.S. Application Data (63) Continuation-in-part of application No. 11/049,378, filed on Feb. 2, 2005, now abandoned.

(60) Provisional application No. 60/934,289, filed on Jun. 11, 2007.

(51) Int. Cl.
*B01L 3/02* (2006.01)

(52) U.S. Cl.
USPC ........... 422/502; 422/503; 422/560; 422/566; 436/177

(58) Field of Classification Search
USPC .................. 422/99, 101, 102, 104, 129, 130, 422/131, 134, 502, 503, 600, 601, 603, 509, 422/537, 538, 560, 566; 436/174, 177, 178, 436/180
See application file for complete search history.

(56) References Cited

U.S. PATENT DOCUMENTS

| | | | |
|---|---|---|---|
| 6,264,891 B1 * | 7/2001 | Heyneker et al. | 422/64 |
| 6,749,814 B1 * | 6/2004 | Bergh et al. | 422/130 |
| 7,435,392 B2 * | 10/2008 | Oberbeck et al. | 422/130 |
| 2002/0045265 A1 * | 4/2002 | Bergh et al. | 436/37 |
| 2003/0223909 A1 * | 12/2003 | Oberbeck et al. | 422/99 |
| 2006/0163143 A1 | 7/2006 | Chirica | |
| 2006/0171852 A1 | 8/2006 | Renzi | |

OTHER PUBLICATIONS

"Bioseparation of Proteins: Unfolding/Folding and Validation" vol. 1, Sadana, Ajit (ed.); (1998), Academic Press, San Diego, CA.
Polanski, J.; Anderson, N. L.; "A List of Candidate Cancer Biomarkers for Targeted Proteomics", Biomarker Insights, 2006:1, pp. 1-48.
"Affinity Separations: A Practical Approach", Matejtschuk, Paul (ed.); 1997, Oxford University Press, New York.
"Separation Methods in Proteomics", Smejkal, Gary B.; Lazareu, Alexander (eds.) 2006, CRC Press, Florida.
Giddings, J. C.; "Concepts and Comparisons in Multidimensional Separation", Journal of High Resolution and Chromatography & Chromatography Communications, 1987, vol. 10, pp. 319-323.
Mallick, P.; Schirle, M.; Chen, S. S.; Flory, M. R.; Lee, H.; Martin, D.; Ranish, J.; Raught, B.; Schmitt, R.; Werner, T.; Kuster, B.; Aebersold, R.; "Computational prediction of proteotypic peptides for quantitative proteomics", Nature Biotechnology, 2007, vol. 25, No. 1, pp. 125-131.

* cited by examiner

*Primary Examiner* — Jill Warden
*Assistant Examiner* — Dwayne K Handy
(74) *Attorney, Agent, or Firm* — Timothy P. Evans (57) ABSTRACT

A multidimensional chemical separation and analysis system is described including a prototyping platform and modular microfluidic components capable of rapid and convenient assembly, alteration and disassembly of numerous candidate separation systems. Partial or total computer control of the separation system is possible. Single or multiple alternative processing trains can be tested, optimized and/or run in parallel. Examples related to the separation and analysis of human bodily fluids are given.

10 Claims, 4 Drawing Sheets

MULTIDIMENSIONAL BIOSEPARATION WITH MODULAR MICROFLUIDICS

CLAIM OF PRIORITY AND CROSS-REFERENCE TO RELATED APPLICATIONS

This application is a Continuation-in-Part of, and claims the benefit of, our United States patent application entitled "Microfluidics Prototyping Platform and Components" filed Feb. 2, 2005 and assigned Ser. No. 11/049,378 now abandoned. This application also claims the benefit of our co-pending United States provisional patent application entitled "Modular Microfluidic Processing System" filed Jun. 11, 2007 and assigned Ser. No. 60/934,289. The entire contents all aforesaid applications are incorporated herein by reference for all purposes.

STATEMENT REGARDING FEDERALLY SPONSORED RESEARCH OR DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing on this invention to license others on reasonable terms.

BACKGROUND OF THE DISCLOSURE

1. Field of Invention

This invention relates generally to the field of chemical separations, particularly to bioseparations and to improvements in multidimensional separations by the use of modular microfluidic systems, processes, devices and components.

2. Description of the Prior Art

"Bioseparation stands at the very center of effective biotechnology development." (*Bioseparation of Proteins* by Ajit Sadana, Academic Press, 1998, p. ix).

Nothing occurring since 1998 has displaced separation technology from its central place in the biotechnology industry. Thus, improvements in bioseparation technology are likely to provide significant benefits to a broad range of endeavors within biotechnology. The systems, techniques and devices described herein are directed to improving separations of complex chemical mixtures, particularly complex mixtures occurring in biosystems, mixtures deriving from biosystems, and/or mixtures of interest in biotechnology. All such mixtures are referred to herein as "biofluids" for economy of language.

An effective separation (or "fractionation") of a complex chemical mixture into fractions having distinct chemical and/or physical properties is almost always necessary for an identification, characterization and/or analysis of the mixture's component species. Moreover, the particular separation protocol that is employed is generally chosen such that the resulting fractions will, as far as feasible, have properties suitable for subsequent analytical, identification and/or characterization steps (e.g., mass spectrometry, gel electrophoresis, and many others). For economy of language herein, we use "separation" or "fractionation" to refer both to the actual separation or fractionation process as well as to the separation process plus any subsequent steps carried out on one or more of the fractions with a view towards obtaining the final result or information of interest.

When performing chemical analysis on mixtures of chemicals, particularly mixtures of biological samples such as human bodily fluids, several challenges typically arise and must be satisfactorily overcome in order to obtain reliable information concerning the chemical species of interest. The sample typically contains a very large number of distinct chemical species. For example, several thousand different proteins may be present in bodily fluids, cell lysates or other samples arising in proteomic or other biological research. Were such samples directly delivered to a typical state-of-the-art detection and/or analytical instrument (mass spectrometer, for example), such an instrument typically would not be able to distinguish, separate or resolve all the components. In particular, the components present in low concentrations are generally hidden under the more abundant components and are thereby not detected. The number of peaks containing biomolecules likely to be produced by the instrument will render it extremely difficult or impossible to achieve comprehensive analysis and obtain reliable information concerning the components of the mixture. Indeed, for many samples of biofluids arising in practice, the complexity of the sample can easily overwhelm the capability of the instrument, resulting in adequate separation or resolution for perhaps only about 30% of the components. For example, of all the currently known cancer biomarkers, most of which have been identified using targeted proteomics, over 48% would be missed by high-end proteomic platforms [M. Polanski, N. L. Anderson, Biomarker Insights 2006: 2, pp. 1-48, "A list of candidate cancer biomarkers for targeted proteomics"].

To analyze such complex mixtures of chemical species, it is typically found to be necessary that the sample be separated or fractionated into several different sub-samples or fractions before analysis is performed. For example, in order to perform mass spectrometry, it is advantageous that each fraction delivered to the mass spectrometer contain no more than about 500 different chemical species, although a smaller number of species in each fraction, typically about 50, would be more advantageous. Thus, separations are performed that concentrate different groups of chemical species into different fractions according to some chemical or physical property (or group of properties) shared by the chemical species. A large number of procedures exist for concentrating different chemical species into different fractions, and there is a corresponding huge literature describing the functions, properties and limitations of such procedures. A survey of many of these procedures with a particular focus on protein separation can be found in Sadana supra; *Affinity Separations, A Practical Approach*, Ed. P. Matejtschuk, Oxford University Press, 1997; *Separation Methods in Proteomics*, Ed. G. B. Smejkal and A. Lazareu, CRC Press, 2006; among many other references. The contents of these references are incorporated herein by reference for all purposes and particularly as related to the descriptions of separation and analytical procedure discussed herein where the cited references (and many others known and readily accessible to researchers in the field) provide detailed descriptions of instruments and procedures for performing chemical analysis.

"Multidimensional separation" typically refers to separation processes that subject the components to be separated to two or more largely independent separative displacements. See, for example, Giddings, "Concepts and Comparisons in Multidimensional Separation," *J. High Resolution Chromatography & Chromatography Comm.*, Vol. 10, pp. 319-323 (May, 1987). We use "multidimensional separation or fractionation" in a similarly broad sense herein referring generally to two or more fractionation steps performed sequentially without restriction as to the type, nature or number of distinct fractionation steps. In other words, in multidimensional methods of separation, different separation methods or systems are coupled. Thus, multidimensional separations can be enormously powerful but also enormously varied as the number of ways of coupling different separation techniques is far greater than the number of techniques available for combination.

An additional challenge in developing effective multidimensional processing relates to the intercompatibility (or lack thereof) between solutions used in different processing steps. For example, loading and elution buffers are often not compatible. That is, the elution buffers of one procedure are often not compatible with the loading buffers of a second procedure such that combining such procedures typically requires that a third step for buffer exchange be performed, complicating the processing procedure.

A further challenge to be met and overcome in the separation/analysis of complex chemical mixtures (especially those arising in connection with bioseparation and/or bioanalysis) is the wide variation of concentrations that may be present. For example, when analyzing for biomarkers in human bodily fluids, the concentration of various species of interest can vary by a factor of $10^6$. when looking for biomarkers in human blood, serum albumen and IgG (Immunoglobulin-G) typically comprise around 95%-96% of all proteins present. In the remaining 4%-5%, a million-fold variation in concentration of various species can be found. Thus, while fractionation may reduce the number of chemical species from several thousand in the original sample to about 500 (or less) in each fraction, the large disparity of concentrations within each fraction further complicates the development of feasible separation and/or analytical procedures.

Proteomic analysis as typically arising in connection with the study of eukaryotic and prokaryotic cells, viruses, phages, etc. is often most concerned with the detection and analysis of low abundance proteins or proteins subject to post-translational modifications, as such species may be critically important signal-bearing molecules. The low concentrations of such species in the presence of other species, several orders of magnitude more abundant in the sample, further complicate the separation/analysis.

Yet further complications can arise when small samples require analysis, perhaps as small as microliters (µl). Manual transfer of such small samples can lead to unacceptable loss of material, and many analytical instruments contain "dead volumes" in which dilution occurs, further decreasing detection limits. That is, dead volume dilution leads to a requirement for additional quantities of sample such that the concentration arriving at the detection/analysis instrument meets the minimum requirements for the particular instrument. The need to be able to process small volumes of sample can arise from several sources including: 1) The need to enrich species present in low abundances and thereby improve the ability to detect them. 2) Some samples are available only in small volumes, for example, biopsies, multi-time point analysis of mouse serum, among others.

In addition, chromatographic/electrographic separations generally derive from the existence of different rates of travel through the separation apparatus for different chemical species, leading to a series of peaks as each chemical species emerges from the apparatus at a different time. Clearly, sharper emerging peaks facilitate the identification of closely related chemical species which may have similar rates of travel. That is, the sharper the peaks, the more peaks can be separated/resolved in a given amount of time. "Diffusion broadening" of the emerging peak occurs when the same chemical species traverses the separation apparatus with a range of different times (typically due to diffusive effects causing a species to take different paths through the apparatus). Thus, a broadened peak emerges from the apparatus, perhaps overlapping or obscuring nearby peaks, thereby reducing or destroying the analytical information that can be obtained. Diffusion broadening tends to be a more serious problem for smaller samples: as the peak broadens it's height decreases (peak area is constant) and the peak can disappear in the background, further exacerbating the detection and/or analysis of µl samples.

In brief, the separation/analysis of complex chemical mixtures, particularly mixtures arising in connection with bioseparations and/or bioanalysis, is generally a complex multi-step process, typically involving many procedures chosen from a large number of candidate procedures, which can often be carried out in numerous ways (sequencing of steps, choice of solvents, temperature, pH, among others). It is a formidable task to select from this staggering array of possibilities the proper separation/analysis protocol that enables accurate determination of chemical species of interest, for example, biological markers. For biological samples, it is frequently envisioned that the protocol will need to be performed many times on clinical samples derived from many different patients or from the same patient at different stages in the treatment or in the progression of the disease. Thus, it is clearly important to have an effective separation/analysis protocol capable of being performed reliably, rapidly and reproducibly, perhaps hundreds of times per day in a clinical environment with potentially serious consequences for inaccuracies.

It is also important to be able to test numerous candidate protocols to arrive at one or more protocols meeting the above criteria, or at least approaching those criteria as closely as is feasible. As noted above, multidimensional separations can be enormously powerful but also enormously complex in terms of the number of different techniques that can be interconnected in numerous ways and such techniques can, separately or in cooperation, be run under many different conditions to produce many different separation protocols. As ever more complex separations and analyses are required to meet the ever more complex needs of biological, medical, environmental, chemical and other fields, the full power of multidimensional separations will be required. Developing and implementing effective protocols can be a time-consuming and complex task.

Thus, there is a need in the art for improved systems, devices, and procedures for the separation and/or analysis of complex chemical mixtures, particularly mixtures of biological substances such as human bodily fluids.

SUMMARY OF THE INVENTION

Accordingly and advantageously the present invention relates to improved procedures, devices and systems for the separation of complex chemical mixtures, particularly biofluids. Modular, microfluidic technology is employed capable of rapid assembly, disassembly and testing of various prototype separation systems, thereby providing more rapid development of effective separation protocols.

Some embodiments of the present invention relate to devices enabling interchangeable, modular coupling of multiple processing steps that have the capability to be operated in an automated or computer-controlled fashion, thereby facilitating the analysis and processing of complex samples. Furthermore, processing of microliter samples is facilitated with reduced or minimal band broadening as well as reduced or minimized sample losses due to adsorption on surfaces of storage containers and/or fluidic conduits. The modular architecture simplifies trouble shooting and system optimization and also facilitates sample-customized processing. That is, the use of modular components enables straightforward construction of systems having multiple processing steps or "sample preparation (prep) trains" including sequential and/or parallel processing steps as needed. Thus, efficient testing and evaluation of multiple candidate sample prep trains is facilitated, specific to a particular sample type and to the particular information sought.

Also, some embodiments of the invention permit cost effective assembly, optimization and/or operation of a microfluidic sample prep train, particularly advantageous for multidimensional processing with more than about three dimensions.

In addition, the characteristics of one or more of the individual modular microfluidic components can be chosen (or specially modified) to be compatible with the desired assisting instrumentation (such as pumps, valves, among others). For example, the format ratios (volume to cross section) of the connecting tubing, the inner geometry of various processing cartridges, the size of the materials packed in the cartridges (among other properties) can be specifically tailored for compatibility with low cost pumps, valves and other components that constitute the tool box of our modular system. This can permit processing protocols and equipment to be assembled, tested, refined and used at much lower cost than is possible with other techniques that may require the use of expensive equipment (such as HPLCs).

An object of some embodiments of the present invention is to provide more efficient assembly and disassembly of candidate separation systems deriving from the compatibility of modular components, including standard interconnections.

Further objects of some embodiments of the invention relate to the capability of testing and employing multi-step separation protocols with perhaps a large number of steps, employing many modular microfluidic components, including the capability of readily building multifunctional processing schemes that can comprise serial processing steps, parallel processing steps and combinations of serial and parallel processing steps. Alternate sample prep trains can be built in the same platform to test and evaluate each route. In particular for biomarker discovery, an important issue relates to the fact that one typically does not know what to look for and new potential disease state indicators (molecules) need to be discovered. Considering the example of phosphopeptide isolation, one would think that just putting all the enrichment methods in series would solve the problem. However, every step in such a sequence is fraught with complications arising from factors such as non-specific interactions, incomplete retention and/or recovery, among others. Work by Mallick et al (Nature Biotechnology, Vol. 25, No. 1, January 2007, pp. 125-131, "Computational Prediction of Proteotypic Peptides for Quantitative Proteomics," the entire contents of which is incorporated herein by reference for all purposes) shows that certain peptides obtained from the digestion of some proteins are detected more often and more reproducibly than others. An ideal sample prep train would enrich, conserve and deliver such peptides to the mass spectrometer to indicate the presence of the parent proteins. Therefore, the number of dimensions that can be employed in processing advantageously reflects a balance between sample fractionation, enrichment, sample recovery/loss and detection capabilities. Therefore, testing various processing trains is usually required in order to increase or to maximize the information mining and efficiency of the overall process.

Other objects of some embodiments of the invention include providing a separation system capable of automated, computer controlled operation, eliminating human-performed steps with the accompanying opportunities for sample loss, human error, and inherently low throughput. Such embodiments are occasionally referred to as a "Modular Automated Processing System" or MAPS, understanding thereby that an automated system is anticipated to be an important, useful feature but is not an inherent requirement.

Further objects of automated, computer controlled embodiments relate to the capability for standardized processing, thereby facilitating comparisons among numerous samples.

Yet another object of some embodiments of the invention is to provide a separation system for improved (rapid, minimized sample loss) separation of microliter samples.

Another object of some embodiments of the invention is to provide a separation system with reduced diffusion broadening.

Further objects of some embodiments of the invention relate to providing high-throughput separation/analysis, and high-throughput separation/analysis in a multi-step (multidimensional) protocol.

Other objects of some embodiments of the invention relate to the reduction of sample loss.

Another object of some embodiments of the invention relates to the use of simple (inexpensive) syringes (valves and columns/cartridges) for delivering materials to the separation system, in contrast with some separation systems that call for input materials to pass through expensive equipment such as HPLC (High Performance Liquid Chromatography).

These and other objects are achieved in accordance with the present invention as described in detail below.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not to scale.

The techniques of the present invention can readily be understood by considering the following detailed description in conjunction with the accompanying drawings, in which:

FIG. 2 is a schematic depiction (2A), and photographic depiction (2B) of a typical multidimensional separation applied to an aqueous virus sample.

DETAILED DESCRIPTION

After considering the following description, those skilled in the art will clearly realize that the teachings of the invention can be readily utilized in the separation and/or processing of complex chemical mixtures, particularly complex mixtures of biological materials, including the effective assembly, testing and evaluation of candidate microfluidic separation systems, devices and/or procedures prior to detection. Typical detection methods include mass spectrometric, UV, fluorescence, electrochemical, among other detection methods known in the art.

The contents of all references cited herein are incorporated herein by reference for all purposes.

The present invention relates generally to the separation of complex chemical mixtures which can arise in numerous fields of application. To be concrete in our discussion, we focus our descriptions and examples on the field of bioseparation and bioanalysis, especially processes related to the location and identification of biomarkers as typically occurring in human bodily fluids. However, this is by way of illustration and not limitation as the systems, techniques, processes and devices described herein will be understood by a person having ordinary skills in the art to be applicable to separation and/or analysis of many types of complex chemical mixtures whether or not related to bioseparation and/or bioanalysis ("bioseparation/bioanalysis"). For example, complex chemical mixtures calling for separation/analysis can arise in fields such as petrochemisty, geochemistry, food science, forensic and post-mortem analysis, veterinary medicine, agriculture, environmental sciences, pollution and hazard monitoring including chemical or biological weapons, among others. However, the general field of bioseparation/bioanalysis provides a good example of the sorts of challenges that are encountered in many areas of application, and this field is expected to be an important area of application for the technology described herein. Thus, our focus herein will be on biological systems and specific examples derived from this general field, understanding thereby that applications to complex chemical mixtures arising from non-biological systems are not excluded.

Our primary concern herein is the separation of complex chemical mixtures into a plurality of distinct fractions. One or more of these fractions is typically the fraction of interest and other fractions lacking chemical components of interest (of which there may be none) are typically treated as waste. For economy of language, we refer to these fraction or fractions of interest as "fractions of interest" or merely "fractions" understanding thereby that the case of only one fraction of interest is included within that description.

The fractions of interest following separation may or may not be subject to further processing. Our chief concern herein is the case in which separation is performed as a prelude to further analysis of the chemical compositions of the fractions. Thus, the separation is to be performed so as to prepare the fractions in a form suitable for the subsequent analysis. Of course, the same analysis need not be performed on each fraction of interest. The further analysis to be performed may include an analysis of the amount present in the fraction of one or more chemical species, or may merely determine the presence or absence (to within the detection limits of the procedure) of one or more chemical species. For economy of language, we refer to all such analytical and/or detection processes as "analysis."

Furthermore, separations may be performed for purposes other than for subsequent analysis of one or more fractions. For example, separation procedures typically result in a higher concentration of some species in certain fractions. These concentrated fractions may be useful as reagents for further chemical processing, performed either as a follow-on stage of the system causing the separation, or in a separate apparatus. The concentrated fraction or faction(s) may be the end product themselves due to the enhanced concentration of a desired component or components, and/or the whole or partial removal of undesired components. To be concrete in our descriptions, we will focus on separations performed with a view towards preparing the material for subsequent analysis, but do not thereby exclude separations performed for other purposes as will be apparent to those skilled in the art.

Figure 1:
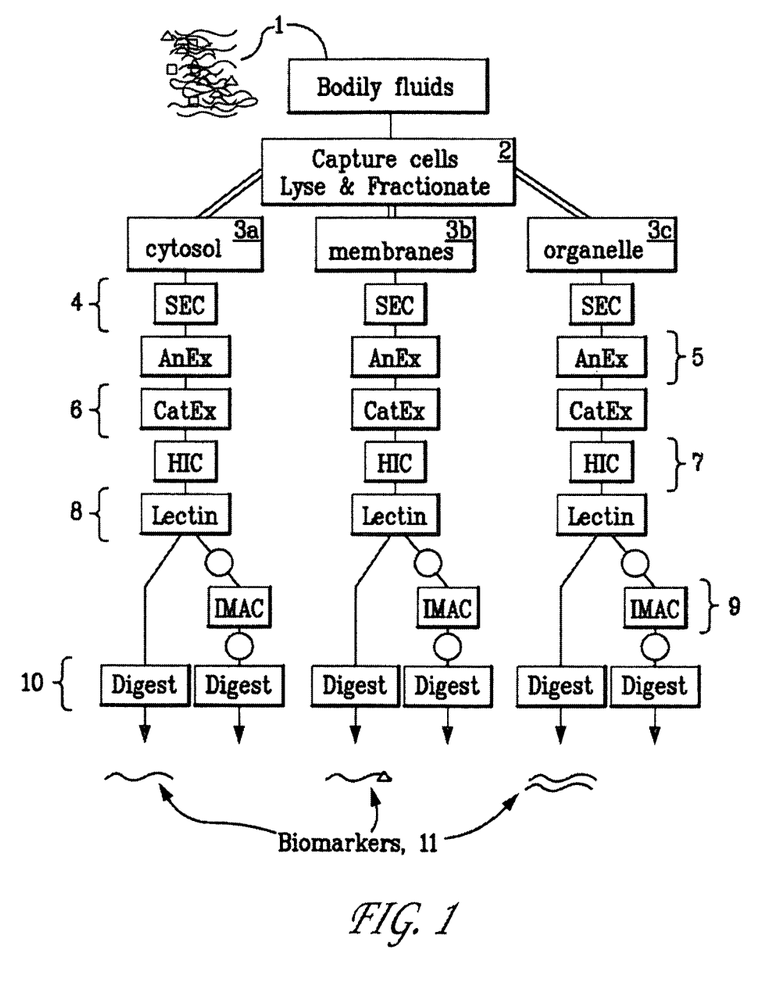
FIG. 1 is a schematic depiction of a flow chart for a typical separation protocol.

FIG. 1 depicts a flow diagram for a typical bioseparation process as might be carried out pursuant to some embodiments of the present invention. A description of this process is useful in illustrating by way of example some of the challenges encountered in bioseparations and how some of these challenges are handled pursuant to some embodiments of the present invention.

In this example, a quantity of bodily fluids containing numerous chemical species 1, is captured or collected and subjected to lysis and fractionation 2, to generate several distinct fractions. Typically, the unprocessed bodily fluids 1 are delivered to the system for processing by means of one or more input ports, typically by injection through a syringe, either manually or under computer or other automated control. Other solvents or reagents required by the various processing steps are also typically delivered to the system with a manual or automated syringe through suitable input or delivery ports.

This example depicted in FIG. 1 considers three fractions of the sample to be worthy of further separation/analysis, but that is by way of illustration and not limitation as a greater or lesser number of fractions may arise depending on the particular separation techniques employed and/or the particular goals of the separation/analysis. In this example, the fractionated samples are presumed to be a cytosol fraction 3a, a membrane-derived sample 3b, and an organelle-containing sample 3c. Numerous separation steps can be used following this initial fractionation but we describe a typical process for purposes of illustration.

The initial fractionation leading to fractions 3a, 3b, 3c may be followed by Size Exclusion Chromatography (SEC) 4. SEC separates components according to molecular size (or, more precisely, according to hydrodynamic volume), typically into two or more size fractions. One of the fractions deriving from SEC is selected for further processing as depicted in FIG. 1. An SEC cartridge particularly suited for use in a modular, microfluidic system is described in provisional patent application 60/934,289, the entire contents of which is incorporated herein by reference.

We note that the individual separation steps depicted in FIG. 1 and elsewhere herein typically separate an input mixture into two or more output fractions. All, some, or only one of the output fractions may call for further separation/analysis in order to obtain the information of interest. For simplicity of depiction, we often show only the output fraction(s) that are to be subjected to further processing, understanding thereby that fractions not needed for subsequent processing steps are discarded and not depicted in the figures.

The output fraction from SEC, 4, may then be subjected to ion exchange chromatography in which various chemical species are retained by a suitably prepared column based upon the charge properties of the molecules, such as anion exchange chromatography (AnEx) 5, retaining negatively charged entities (anions), or cation exchange chromatography (CatEx) 6, retaining positively charged entities (cations).

Hydrophobic interaction chromatography (HIC) 7, may also be employed to separate proteins or other components based upon hydrophobic attractions arising between hydrophobic entities on the surface of the chromatography column or stationary phase, and hydrophobic groups or regions of molecules in the mixture, such as proteins.

The example depicted in FIG. 1 shows Ion Exchange Chromatography (cation or anion, "IEX") followed directly by HIC. In fact, this sequence of steps is among the few that that are "compatible" or "chemically compatible" in that an intervening buffer exchange step is not needed since the sample eluted from IEX columns typically use buffers with high salt concentrations and are retained on the HIC packing. However, in the more common case of chemical incompatibility between steps in the separation sequence, it is one advantage of the current separation system that buffer exchange components can be readily be used as components in the separation sequence to enforce chemical compatibility where required.

HIC is one of many separation techniques generally known as "affinity chromatography" in which a substance having preferential affinity for one or some components in the mixture to be separated is immobilized on a stationary column. As the mixture flows past the column, those species preferentially attracted to the immobilized species are retained or retarded in their course. Retarded species emerge from the column later than non-retarded species, effecting separation. Retained species may typically be removed from the stationary column (if desired) by eluting with a suitable solvent, changing pH, among other techniques. Another example is Lectin Affinity Chromatography (Lectin) 8, used to separate various carbohydrate species based upon differing affinities for specific lectin immobilized on the stationary column.

Digestion can include a single digestion step (such as trypsin digestion), or a series of digestion steps (such as trypsin digestion followed by pepsin, pronase or others as required by the specific protocol.

FIG. 1 also depicts an output from the Lectin step going directly to a digestion step 10, resulting in mixtures suitable for further analysis, typically mass spectrometry, where it is expected that at least some of the final fractions, 11, contain biomarkers of interest. In addition, some output from the Lectin step can be subjected to Immobilized Metal Affinity Chromatography (IMAC), 9 also known as Immobilized Metal (ion) Affinity Chromatography. IMAC makes use of specific coordinate covalent bonding between certain amino acids and certain immobilized metals to effect separation. In general, as depicted in FIG. 1, the results of the multidimensional chemical separation results in different fractions being delivered to different output ports, 11, where each fraction may be subject to a distinct subsequent processing, or discarded as waste.

Figure 3:
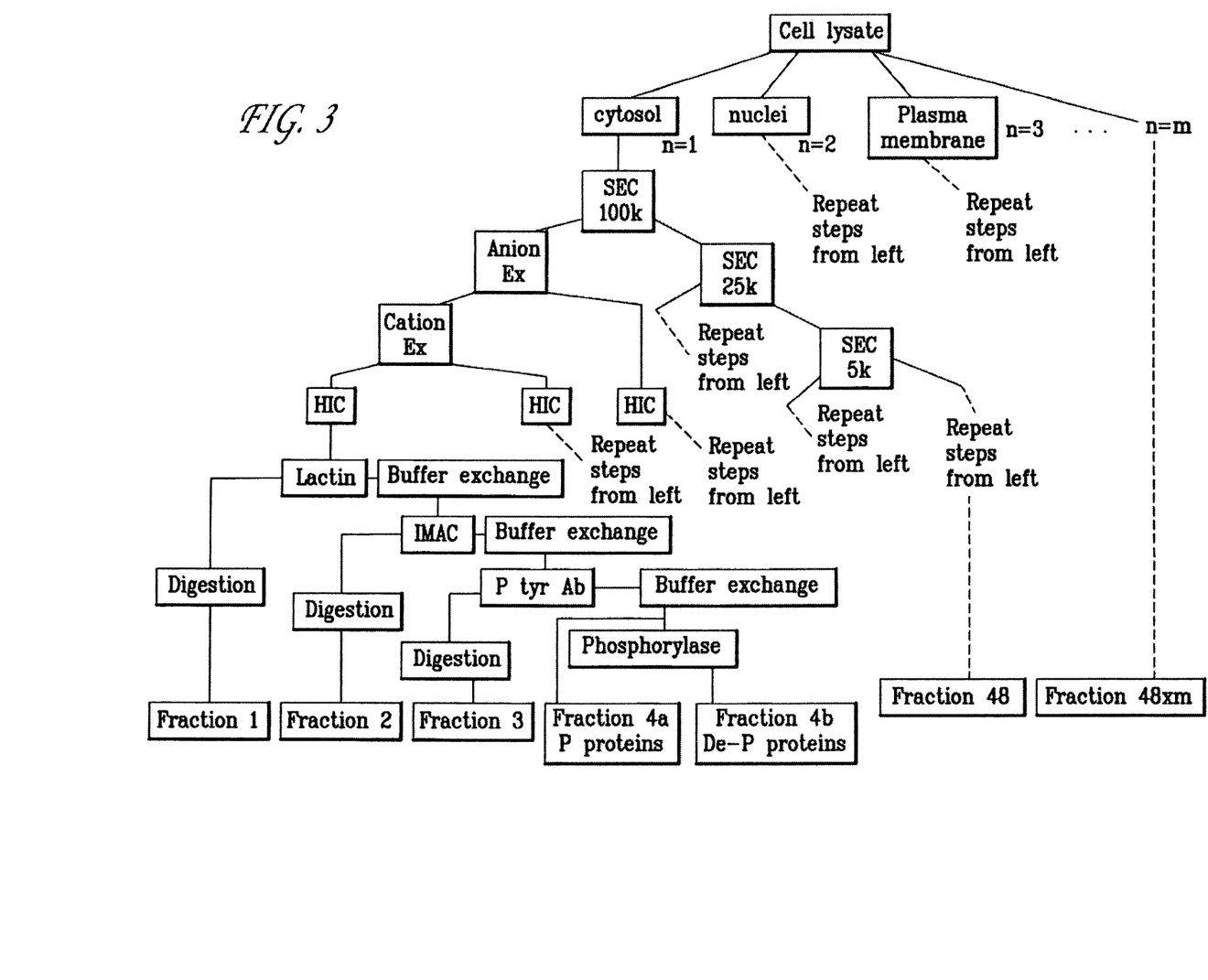
FIG. 3 is a schematic depiction of a flow chart for another typical separation protocol.

This example illustrates a typical multidimensional separation in which all of the initial fractions 3a, 3b, 3c are subject to the same separation processes in the same order. While this often occurs in actual laboratory or clinical separations, this is by way of illustration and not limitation. FIG. 3 depicts another separation protocol applied to a cell lysate in which different fractions (after the first) receive different treatments. It is apparent to those skilled in the art that numerous distinct and different sequences and number of separation steps can be applied to different fractions as determined by the particular characteristics of the sample and the analytical results sought.

Figure 2A:
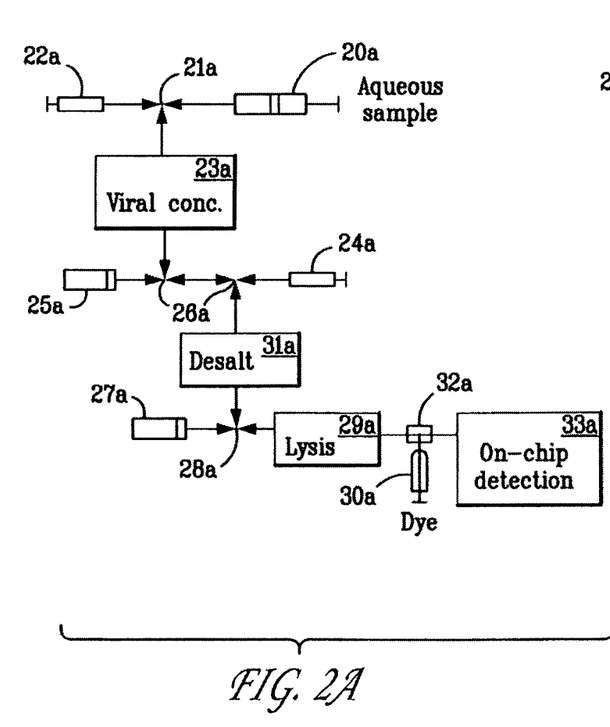
Figure 2B:
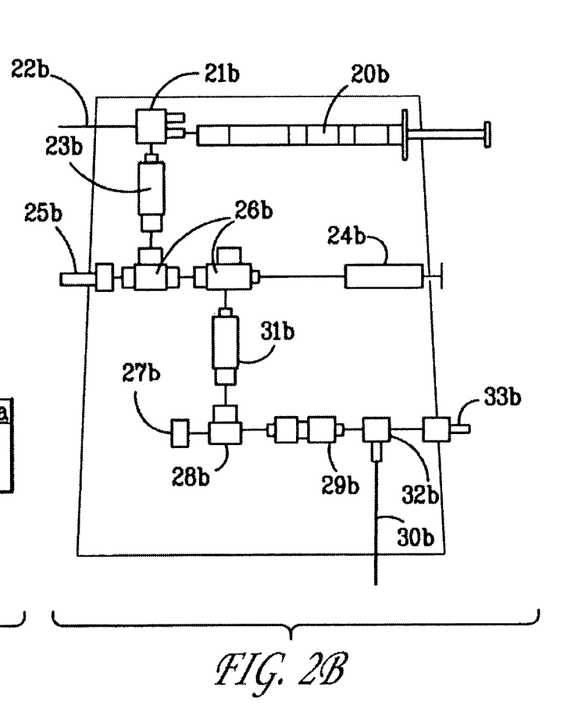

FIG. 2 is one example of a modular microfluidic embodiment of a typical multidimensional separation pursuant to some embodiments of the invention, depicted schematically in FIG. 2A and, as actually implemented on a microfluidic breadboard, in FIG. 2B. This particular example relates to bioseparations and bioanalyses deriving from viruses in water. This example is intended to illustrate some of the advantages of some embodiments of the invention, but not limit the invention to any particular features or combination of features in this illustrative example. For simplicity of notation, we refer to the components in FIG. 2 merely by the number, understanding thereby that either "a" or "b" suffix is intended, e.g., "20" indicates either "20a" or "20b" without distinction.

An aqueous sample of virus can be injected through syringe 20 through valve 21 and into virus concentrator 23, where valve 21 is set to direct the virus solution into the virus concentrator and block flows towards 22. The virus concentrator 23 typically contains a virus-absorbing material that preferentially retains viruses or coat-virus proteins as the aqueous solution containing viruses flows through in contact with this material. Even in cases where relatively large samples are available (i.e., milliliters, ml), it will typically be the case that the sample is enriched in the component of choice (virus) and reduced to several µl when the concentration in 23 is completed. Thus, handling µl quantities of sample reproducibly and reliability is an important advantage of some embodiments of the invention.

When the desired amount of virus solution has passed through concentrator 23, valve 21 is reset to allow solvent from syringe 22 (or other suitable delivery device) to pass through concentrator 23 but is blocked from flowing towards syringe 20. The solvent delivered from 22 is chosen so as to elute the retained viruses from concentrator 23. In this case, when the cartridge is packed with ion exchange material, this will typically be a salt buffer solution. To ensure compatibility with downstream analysis and/or detection methods, the salt needs to be removed from the sample before further processing.

The sequence of steps in this example illustrates several advantages deriving from some embodiments of the invention. Valves 21 and 26 can be computer controlled, rendering the process automatic and reproducible. Furthermore, even the relatively small number of distinct steps depicted in FIG. 2 become tedious and time consuming for a human technician, tending towards errors and sample loss (especially when µl samples are processed). That is, valves 21 and 26 are initially set so as to deliver the virus solution from syringe 20 through concentrator 23 and into waste receptacle 25. Following completion of the virus delivery, valves 21 and 26 are reset such that the elution solvent (or elution buffer) from 22 is directed through concentrator 23 and into desalting apparatus 31. Desalting of intact virus in apparatus 31 is advantageously performed by size exclusion chromatography (SEC) making use of a suitable SEC buffer delivered through syringe 24. SEC is operated in this case to provide two elution peaks and, understanding the characteristics of the SEC process for the chemical species of interest, valve 28 is set to deliver unwanted materials to waste receptacle 27 and reset to deliver the desired sample components for further processing, in this example thermal lysis, 29. The proteins emerging from the lyser 29 may be labeled with fluorescent dye delivered from 30 into reaction chamber 32 for on-chip detection 33, typically capillary gel electrophoresis (CGE).

This example illustrates several features advantageously provided by some embodiments of the invention. In brief, some of the advantages illustrated in this example include: 1) That multidimensional bioseparation using modular microfluidics is readily followed by direct detection or analysis, either on-chip or mass spectrometry, as the methods, systems and devices are typically compatible with both. 2) The process is self-contained reducing sample loss due to handling or other transfer processes. 3) The valves and components are amenable to computer control, permitting automation of the entire process. 4) The components are readily interconnected on a breadboard as described in our co-pending patent application Ser. No. 11/049,378, suitable for rapid prototyping and testing of numerous multidimensional protocols. 5) Various modules for processing the samples, such as buffer exchange, concentration (e.g., 2006/0163143 A1), lysis, among others can also be designed to fit and make use of the interconnects of Ser. No. 11/049,378.

In addition to chemical separations, detections and/or analyses, the techniques, procedures, components and/or systems described herein can also be advantageously used for biomarker discovery. An example of this is provided in FIG. 4. For the example depicted in FIG. 4, serum (for example) is passed through modules that collect one-by-one specific groups of components that are present in the serum before carrying out the so-called "shot-gun proteomics" approach in which all components are digested, separated on a two-dimensional system (typically cation exchange and reversed phase), followed by injection into a mass spectrometer for analysis/detection. A useful way to picture this process is to picture peeling an onion one layer at a time (analogous to the one-by-one collection steps) and then using a "shot-gun" process on just the remaining core.

Figure 4:
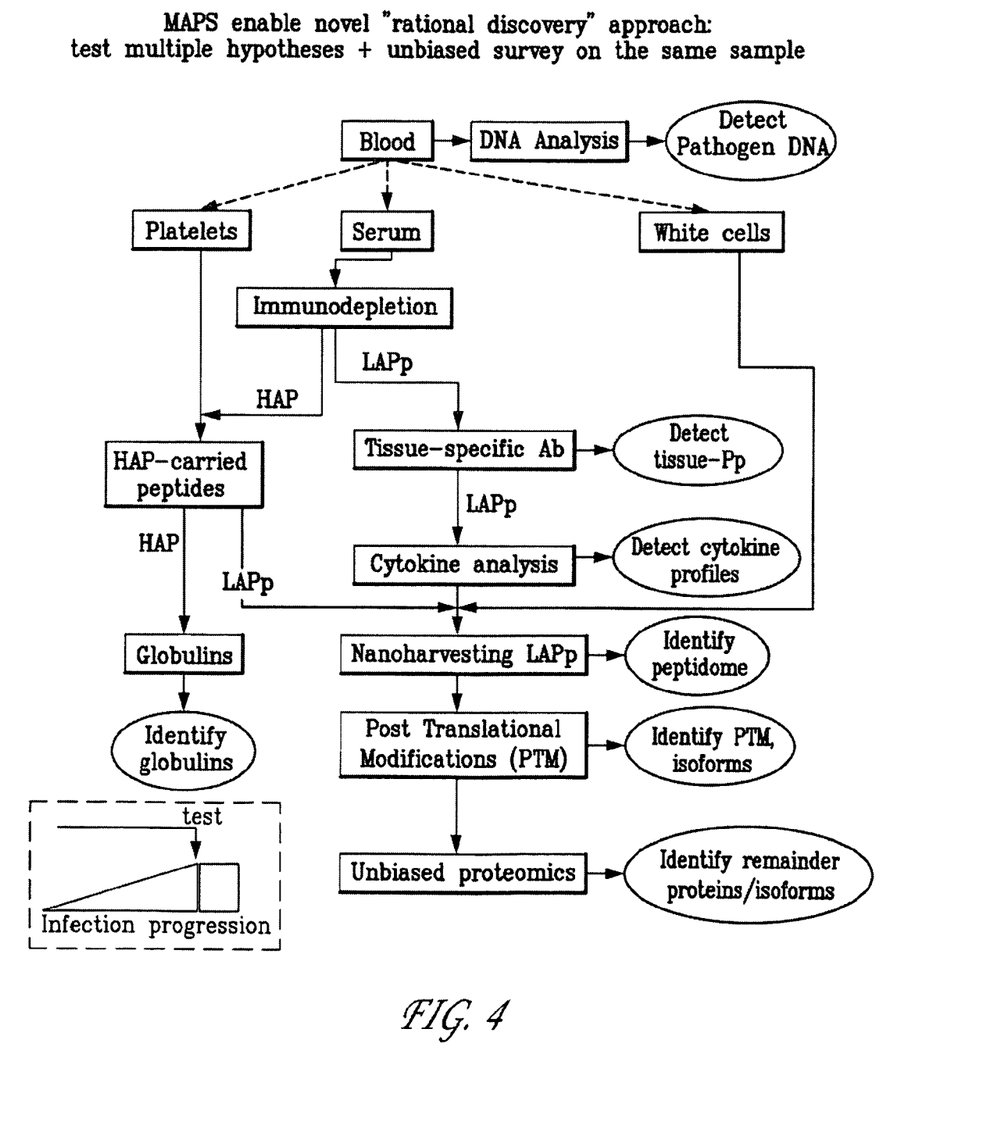
FIG. 4 is a schematic depiction of a flow chart for a typical biomarker discovery process.

Typical examples of processes in which the sort of process depicted schematically in FIG. 4 could advantageously be employed include samples containing specific groups such as high abundance proteins (for which so-called depletion columns can be advantageously used to remove proteins that are present in high abundance), small molecular weight proteins/peptides, phosphorylated peptides or proteins, glycosylated proteins, cytokines, among others. While the above approaches have been used one or two at a time using current off-line, bench-top protocols, manual and/or HPLC-based, the time and effort involved seriously limits the protocols that can be tested. The present modular, automated system operates with small (often negligible) sample loss, and it enables truly multidimensional operation (4 to 10 dimensions or more) to be effectively carried out in a high-throughput fashion. It further enables simultaneous/concomitant selection of fraction(s) based on the structural features of each group to generate fractions that have a much more manageable size and are, at times, functionally related. For example, one type of separation, affinity separation, selects only one analyte or group of analytes, such as phosphorylated proteins and is used to enrich or deplete the sample of this specific protein. Thus, each candidate fractionation scheme may generate its own proteotypic peptides, and improved or optimal selection of the train is necessary to improve (or to achieve at all in some cases) detection of low abundance species. The present capability for rapid assembly and testing of various trains can markedly improve the speed and effectiveness and, in some cases, produce results not feasible to obtain by any other approach.

The "Rapid Prototyping Platform" described in Ser. No. 11/049,378 is particularly advantageous for the multidimensional separation process described herein since, among other advantages, it has a structure facilitating the rapid and robust fabrication of prototype microfluidic systems, designed for easy assembly and disassembly making use of Modular-Microfluidic Components as in Table I and in Ser. No. 11/049,378. One or more Rapid Prototyping Platforms can be used simultaneously with system components joined from one platform to another and/or single components overlapping one or more Rapid Prototyping Platforms. In addition, the structure of the Rapid Prototyping Platform is not restricted to a system with all components being substantially co-planar. That is, multi-layered, multidimensional separation systems can be rapidly constructed and tested.

"Rapid Prototyping Platform" as used herein denotes a prototyping platform having a structure so as to facilitate the rapid and robust fabrication of microfluidic systems. Typical prototyping platforms have an array of holes therein in a standard geometry and size suitable for receiving a variety of fasteners for attaching various microfluidic devices and other components including interconnects, spacers, fasteners, fittings and capillaries having structures coordinate with the structure of the prototyping platform.

Several challenges typically arise in the construction of systems consisting of interconnected microfluidic devices and related components as such devices typically function at the interface between meso-scale and micro-scale dimensions. That is, internal fluid pathways and the like typically approach micro-scales, while the dimensions of overall components, suitable for assembly by human technicians, are typically meso-scale. Fabrication of prototype devices at this dimensional interface must deal with inherently diverging considerations with the relatively fragile nature of micro-components and the relatively coarse nature (at such dimensions) of human mechanical manipulations.

Further microfluidic fabrication challenges arise in the fabrication of prototype microfluidic systems from discrete microfluidic devices and related components, especially when designs are not fully determined and some flexibility and experimentation in fabrication is advantageous, or when prototype microfluidic system boards providing discrete component protection or application-specific functional needs exist. As described more fully in Ser. No. 11/049,378, the use of the Rapid Prototyping Platform ("RPP") facilitates the rapid and robust fabrication of microfluidic systems. Typical RPP platforms as used herein have an array of holes therein in a standard geometry and size suitable for receiving a variety of fasteners for attaching various microfluidic devices and other components. Other components suitable for use with the RPP include interconnects, spacers, fasteners, fittings and capillaries having structures coordinate with the structure of the prototyping platform, further facilitating rapid and flexible assembly of microfluidic systems.

The construction of microfluidic prototype devices can be an involved, arduous and manually difficult task in which it is desirable that standard components be employed that are capable of assembly in diverse configurations. Advantages of RPP in connection with the present invention include the ability to assemble microfluidic components into numerous standard and non-standard configurations including, for example, in non-perpendicular configurations. That is, the major axes of interconnects and other components need not be restricted to have only parallel and perpendicular orientations with respect to the prototyping platform. Furthermore, stack mountings with components mounted immediately above one another, and variable-height mounting to accommodate various component dimensions, are also feasible in some embodiments of the present invention. Such stack mountings can include attaching overlying platforms or components to one another via fasteners that engage an amenable feature located on any surface of another platform or component. For example, two platforms, each with it's own components, can be kept apart a desired distance by spacers located between the two platforms, and held together by individual fasteners, each of which engages both platforms. Or components can attach directly to other components already attached to a platform, for example, a protruding fastener on one component can engage a mating feature on another component. Or both platform and component attachments can be used in dual or multi-level stacking.

It is envisioned that an important advantage of using the RPP in connection with the present invention relates to the ability to construct prototype microfluidic systems rapidly and efficiently, test the efficacy of the process and improve, rearrange or substitute components for further testing of other prototypes.

Important practical advantages of the RPP prototyping platform and devices include the ability to mount components loosely on the RPP, allowing rotation or sliding of components prior to securely affixing such components to each other and to the platform. This feature is quite helpful when making connections between components that are very close together, since short lengths of capillary tubes are typically rigid and difficult to insert into connector bodies unless the connector bodies themselves are able to rotate or shift about their mounted positions.

Table I lists a tool kit of various components known in the art or referenced herein that can be interconnected in numerous ways to create a multitude of multidimensional microfluidic separation protocols. To be concrete in our expression we use "Microfluidic-Modular-Components" to refer to the components of Table I as well as other microfluidic components known in the art and capable of being interconnected to perform multidimensional separations. Just a small number of typical examples are provided herein, readily understood by those skilled in the art to be capable of modification using combinations of the Microfluidic-Modular-Components of Table I.

Although various embodiments which incorporate the teachings of the present invention have been shown and described in detail herein, those skilled in the art can readily devise many other varied embodiments that still incorporate these teachings.

TABLE I

Modular Microfluidic Tool Kit:
Microcomponents as enumerated herein are typically reusable, inexpensive, and better suited for processing microliter samples.

peristaltic pump
syringe
syringe pump
dielectrophoresis (DEP) concentration chip
solid phase extraction (SPE) cartridge
lysing cartridge
high-voltage lysis cartridge
lysing heater
flow-switching valve
microfluidic fittings and connectors including:

Tee interconnect
Elbow interconnect
Union interconnect
Cross interconnect
ferrules and tubing
manifolds
microvalves
filtering cartridge
sieving cartridge
desalting cartridge
Size exclusion chromatography (SEC) cartridge
contaminant removal cartridge
digestion cartridge
enzymatic digestion cartridge
buffer exchange cartridge
viral concentration cartridge
ion exchange chromatography cartridges anion exchange chromatography cartridge
cation exchange chromatography cartridge
affinity-based interaction cartridges
hydrophobic interaction chromatography (HIC) cartridge
lectin affinity chromatography cartridge
Immobilized Metal (ion) Affinity (IMAC) Chromatography
capillary gel electrophoresis chip

What is claimed is:

1. A system for performing multidimensional sequential chemical separations comprising:
at least one Rapid Prototyping Platform wherein one or more of said at least one Rapid Prototyping Platform includes a plurality of holes therein having a standard geometry and size suitable for receiving fasteners for attaching components to said one or more of said at least one Rapid Prototyping Platform and at least one adjustable spacer configured to elevate one or more of the components above a surface of said one or more of said at least one Rapid Prototyping Platform;
a plurality of interconnected Modular Microfluidic Components attached to said one or more of said at least one Rapid Prototyping Platform by means of fasteners suited for engaging one or more of said plurality of holes wherein said Modular Microfluidic Components are interconnected so as to form a chemical separation system capable of receiving a sample through an input port and capable of delivering one or more fractions to one or more output ports of said separation system, and wherein said plurality of interconnected Modular Microfluidic Components includes three or more Modular Microfluidic Components connected sequentially, and wherein said fasteners engaging said one or more of said plurality of holes in said one or more of said at least one Rapid Prototyping Platform are capable of rapid attachment and detachment from said holes thereby permitting effective system disassembly and reassembly into a different prototype system, optionally including one or more different Modular Microfluidic Components; and
a plurality of computer controlled valves, wherein each of the plurality of computer controlled valves are in fluid communication with one of the three or more Modular Microfluidic Components and one of a plurality of waste systems, and wherein each of the plurality of computer controlled valves are capable of automatically controlling, in a first setting, a flow of the sample or one or more fractions between each of the three or more Modular Microfluidic Components, and in a second setting, unwanted materials to one of the plurality of waste systems.

2. A system as in claim 1 further comprising at least one device for performing analysis interconnected to at least one of said one or more output ports.

3. A system as in claim 1 further comprising a computer connected to one or more of said Modular Microfluidic Components for automatic control of said one or more Modular Microfluidic Components.

4. A system as in claim 1 wherein said device for performing analysis is an on-chip analytical device capable of being attached to said at least one Rapid Prototyping Platform by means of fasteners suited for engaging one or more of said plurality of holes.

5. A method of performing multidimensional sequential chemical separations comprising:
providing at least one Rapid Prototyping Platform wherein said Rapid Prototyping Platform includes a plurality of holes therein having a standard geometry and size suitable for receiving fasteners for attaching components to said Rapid Prototyping Platform and at least one adjustable spacer configured to elevate one or more the components above a surface of said one or more of said at least one Rapid Prototyping Platform;
providing a plurality of interconnected Modular Microfluidic Components attached to said at least one Rapid Prototyping Platform wherein said Modular Microfluidic Components are interconnected so as to form a chemical separation system, and wherein said plurality of interconnected Modular Microfluidic Components includes three or more Modular Microfluidic components connected sequentially, and wherein said fasteners engaging said one or more of said plurality of holes in said Rapid Prototyping Platform are capable of rapid attachment and detachment from said holes thereby permitting effective system disassembly and reassembly into a different prototype system, optionally including one or more different Modular Microfluidic Components;

delivering a sample through at least one input port into a first component of said plurality of interconnected Modular Microfluidic Components;

receiving one or more fractions at one or more output ports of said chemical separation system; and a plurality of computer controlled valves, wherein each of the plurality of computer controlled valves are in fluid communication with one of the three or more Modular Microfluidic Components and one of a plurality of waste systems, and wherein each of the plurality of computer controlled valves are capable of automatically controlling, in a first setting, a flow of the sample or one or more fractions between each of the three or more Modular Microfluidic Components, and in a second setting, unwanted materials to one of the plurality of waste systems.

6. A method as in claim 5 wherein said sample is a biofluid.

7. A method as in claim 6 wherein said biofluid is a human bodily fluid.

8. A method as in claim 5 further comprising at least one device for performing analysis interconnected to at least one or said output ports.

9. A system as in claim 1 wherein at least one of said Modular Microfluidic Components is located between two chemically incompatible Modular Microfluidic Components capable of performing buffer exchange resulting in chemical compatibility of said chemically incompatible Modular Microfluidic Components.

10. A method as in claim 5 wherein at least one of said Modular Microfluidic Components is located between two chemically incompatible Modular Microfluidic Components and performed buffer exchange resulting in chemical compatibility of said chemically incompatible Modular Microfluidic Components.

* * * * *